(12) United States Patent
Sarangam et al.

(10) Patent No.: US 7,206,833 B1
(45) Date of Patent: Apr. 17, 2007

(54) PLATFORM INDEPENDENT ALERT DETECTION AND MANAGEMENT

(75) Inventors: Parthasarathy Sarangam, Beaverton, OR (US); Anil Vasudevan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/410,483

(22) Filed: Sep. 30, 1999

(51) Int. Cl.
*G06F 15/173* (2006.01)

(52) U.S. Cl. ............... 709/224; 709/202; 709/217; 709/223; 709/230; 710/15; 710/18; 710/19; 710/261; 710/267; 714/2; 714/10; 714/25; 714/39; 714/48

(58) Field of Classification Search ............... 709/101, 709/104, 217, 223, 224, 230, 202, 203, 221; 710/15, 18, 19, 261, 267, 17; 714/2, 10, 714/25, 39, 48, 47, 5
See application file for complete search history.

(56) References Cited

U.S. PATENT DOCUMENTS

| | | | |
|---|---|---|---|
| 5,168,566 A | | 12/1992 | Kuki et al. |
| 5,175,855 A | | 12/1992 | Putman et al. |
| 5,181,201 A | | 1/1993 | Schauss et al. |
| 5,309,563 A | | 5/1994 | Farrand et al. |
| 5,550,980 A | * | 8/1996 | Pascucci et al. ............ 250/551 |
| 5,600,782 A | | 2/1997 | Thomson |
| 5,689,708 A | * | 11/1997 | Regnier et al. |
| 5,732,268 A | | 3/1998 | Bizzarri |
| 5,838,907 A | | 11/1998 | Hansen |
| 5,860,010 A | * | 1/1999 | Attal et al. |
| 5,931,911 A | * | 8/1999 | Remy et al. ................ 709/223 |
| 5,968,116 A | * | 10/1999 | Day, II et al. |
| 5,968,176 A | * | 10/1999 | Nessett et al. |
| 5,978,912 A | * | 11/1999 | Rakavy et al. |
| 5,987,514 A | * | 11/1999 | Rangarajan |
| 5,987,554 A | | 11/1999 | Liu et al. |
| 6,012,100 A | * | 1/2000 | Frailong et al. ............ 709/250 |
| 6,065,053 A | | 5/2000 | Nouri et al. |
| 6,108,782 A | * | 8/2000 | Fletcher et al. ............ 713/153 |
| 6,161,133 A | | 12/2000 | Kikinis |
| 6,182,157 B1 | * | 1/2001 | Schlener et al. ............ 719/318 |
| 6,182,180 B1 | | 1/2001 | Liu et al. |
| 6,198,722 B1 | * | 3/2001 | Bunch |
| 6,219,708 B1 | * | 4/2001 | Martenson |
| 6,243,746 B1 | * | 6/2001 | Sondur et al. |
| 6,249,885 B1 | | 6/2001 | Johnson et al. |
| 6,253,243 B1 | * | 6/2001 | Spencer |
| 6,272,537 B1 | * | 8/2001 | Kekic et al. ................ 709/223 |
| 6,275,864 B1 | | 8/2001 | Mancusi et al. |
| 6,282,568 B1 | * | 8/2001 | Sondur et al. |
| 6,286,038 B1 | | 9/2001 | Reichmeyer et al. |
| 6,308,206 B1 | * | 10/2001 | Singh |

(Continued)

*Primary Examiner*—Saleh Najjar
*Assistant Examiner*—Michael Y. Wong
(74) *Attorney, Agent, or Firm*—Blakely, Sokoloff, Taylor & Zafman LLP

(57) ABSTRACT

Platform independent alert detection and management. A software-based intermediary referred to herein as an alert proxy is used to transform binary, device-specific event or alert data into user-friendly plain text explanations of the event. A management device containing the alert proxy is able to return a contextually correct description of the event to an administrator or other interested party based upon the characteristics of the specific device initiating the event. Event data may be generated by alert software executing on an alert-enabled managed client or by alert hardware embodied within an alert-enabled managed client.

15 Claims, 14 Drawing Sheets

U.S. PATENT DOCUMENTS

| | | |
|---|---|---|
| 6,349,333 B1 * | 2/2002 | Panikatt et al. |
| 6,353,854 B1 | 3/2002 | Cromer et al. |
| 6,363,421 B2 * | 3/2002 | Barker et al. |
| 6,363,422 B1 | 3/2002 | Hunter et al. |
| 6,381,742 B2 * | 4/2002 | Forbes et al. ............... 717/176 |
| 6,425,006 B1 * | 7/2002 | Chari et al. ................. 709/224 |
| 6,480,901 B1 * | 11/2002 | Weber et al. ............... 709/246 |
| 6,487,590 B1 * | 11/2002 | Foley et al. ................ 709/223 |
| 6,490,620 B1 * | 12/2002 | Ditmer et al. |
| 6,505,305 B1 * | 1/2003 | Olarig .......................... 714/5 |
| 6,584,499 B1 * | 6/2003 | Jantz et al. ................. 709/220 |
| 6,604,137 B2 * | 8/2003 | Cowan et al. .............. 709/224 |
| 6,738,388 B1 | 5/2004 | Stevenson et al. |
| 6,769,022 B1 * | 7/2004 | DeKoning et al. .......... 709/223 |
| 6,922,722 B1 * | 7/2005 | Mann et al. ................ 709/220 |
| 2002/0184360 A1 * | 12/2002 | Weber et al. ............... 709/223 |

\* cited by examiner

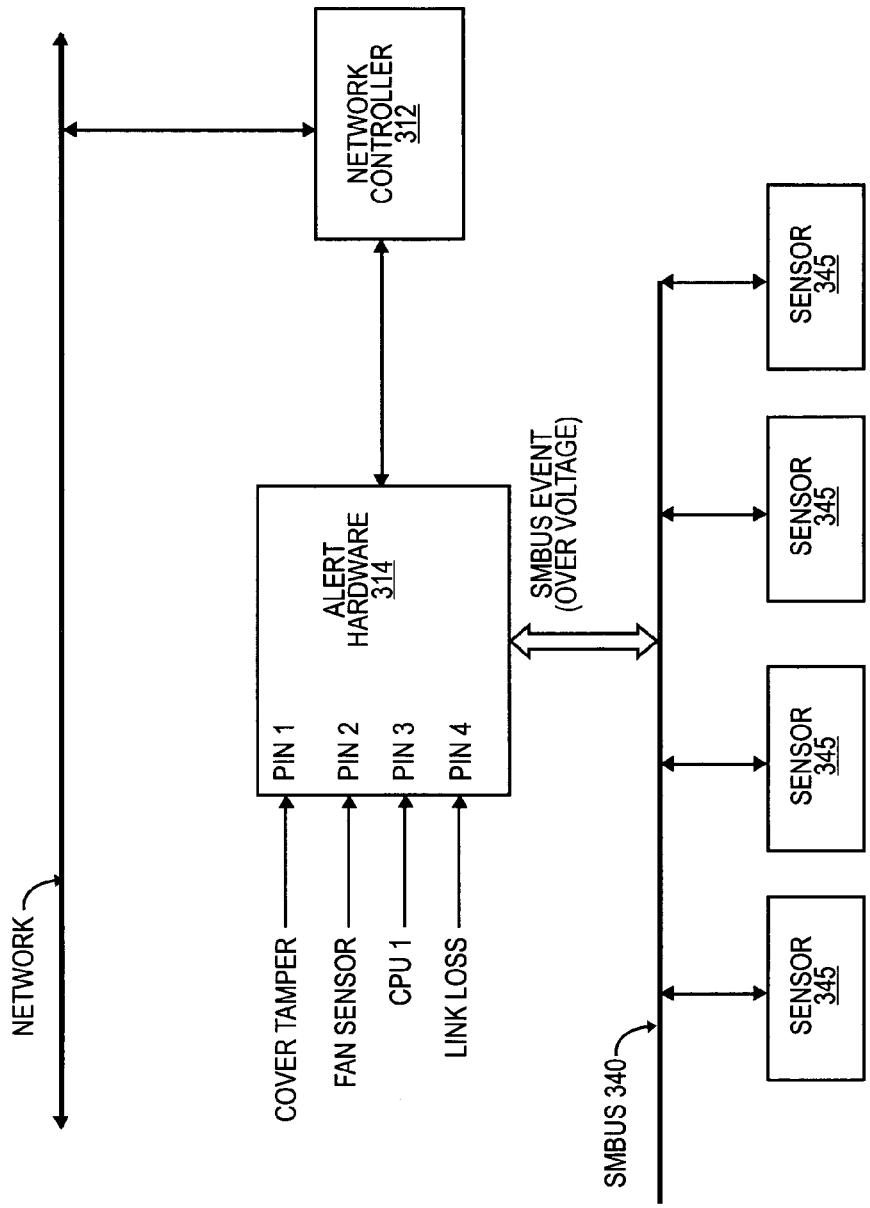

FIG. 4B

| | | |
|---|---|---|
| 422 | MESSAGE TYPE | Identifies Specific Alert Hardware |
| 424 | SYSTEM ID | Identifies Specific Platform Type |
| 426 | UUID | Identifies A Client Entity |
| 428 | EVENT TYPE | Identifies Alert Hardware Event Type |
| 430 | MESSAGE | Contains A Software Message Used By "Software" Events |
| 432 | EVENT EXTENSION | Contains Descriptor Data Used By "Compound" Events |
| 434 | EVENT DATA | Contains Additional Event Information |

FIG. 5A

505 → [LANGUAGE_MAP]
　　　esm = esp

510 → [SYSTEM ID]
511 → XXX = CompanyXYZ
512 → YYY = CompanyABC

520 → [EVENT_TYPE]
　　　0 = SIMPLE
521 → 1 = SIMPLE
522 → 8 = SOFTWARE
523 → 90 = COMPOUND

530 → [EVENT_MAP]
531 → CompanyXYZ = 1,2; 2,2; 84,9; 90,7

540 → [EVENT_LIST]
　　　0 = 13000;14014
541 → 1 = 13001;14015
　　　2 = 13002;14016
　　　3 = 13003;14017

550 → [COMPANYXYZ_90]
551 → 7 = 8
552 → 9 = 10
　　　[RESOURCE_MAP]
　　　CompanyXYZ = XYZ
　　　CompanyABC = ABC

565 → [COMPANYXYZ]
　　　0106=2712

FIG. 6A

610 → [FUNCTION_LIST]
    0 = 20000;21015
    1 = 20001;21016
616 → 2 = 20002;21017

620 → [FUNCTION_MAP]
622 → COMPANYXYZ = 1,1;2,2;3,3;4,4;5,5;9,6

630 → [SUBFUNCTIONS_2]
632 → 0 = 16001;16002
634 → 1 = 16003;16004

[COMPANYXYZ]
DeviceType = 0
StatusPolarity = 0xD9
StatusPowerupMask = 0x1B
StatusPowerdownMask = 0x19

[CompanyXYZ]
652 → 101    I:300401
     110    W:300402
     114    C:300403

[CompanyABC]
662 → 101    300402;300800;300801
     110    300405

FIG. 6B

672 → 300401    A failure occurred during testing of the system board
      300402    A memory parity failure occurred
      300403    Adapter ROM failure
      300800    Memory may be defective
      300801    Replace memory

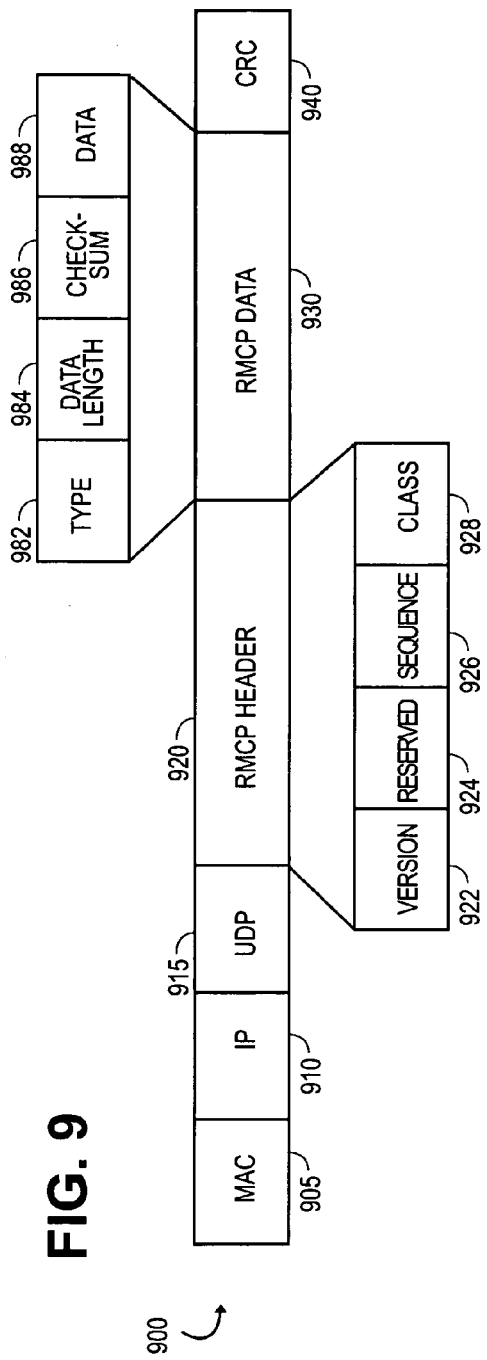
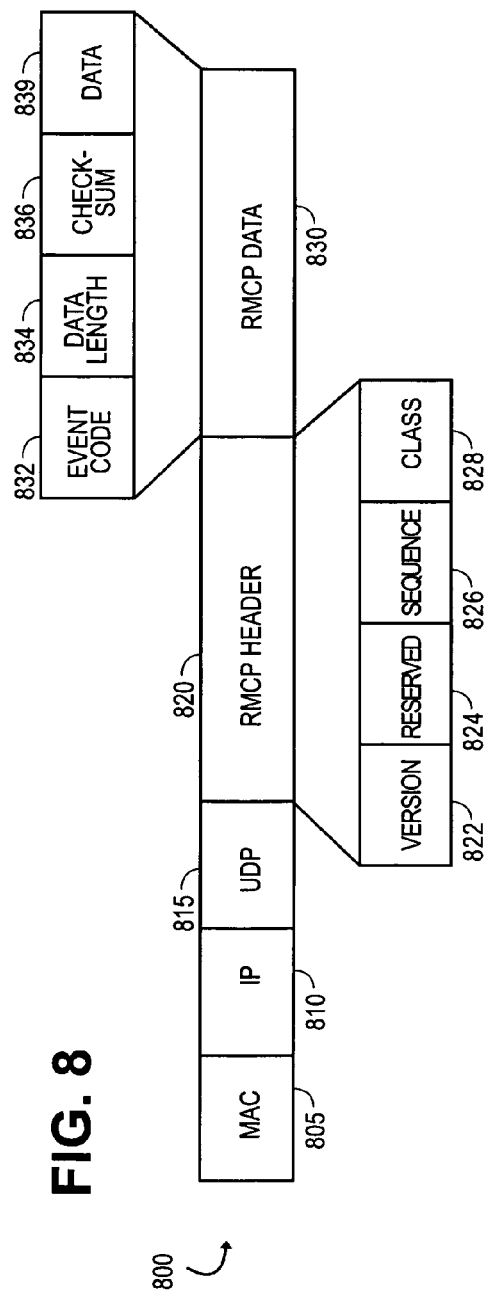
FIG. 9
FIG. 8

PLATFORM INDEPENDENT ALERT DETECTION AND MANAGEMENT

This nonprovisional patent application is related to contemporaneously filed nonprovisional U.S. patent application Ser. No. 09/410,483 entitled "METHOD AND APPARATUS FOR PERFORMING NETWORK-BASED CONTROL FUNCTIONS ON AN ALERT-ENABLED MANAGED CLIENT", and contemporaneously filed nonprovisional U.S. patent application Ser. No. 09/409,627 entitled "METHOD AND APPARATUS FOR DYNAMIC UNATTENDED NETWORK CONFIGURATION OF AN ALERT-BASED CLIENT"

BACKGROUND OF THE INVENTION

1. Field of the Invention

The present invention relates generally to the field of networking. Specifically, the present invention relates to platform independent alert detection and management.

2. Background of the Invention

As the size and complexity of computer networks continues to grow, so too does the time required to maintain such networks. It is not uncommon for local area networks that once required only a single network administrator to now require multiple administrators or even a dedicated network support department.

As networks continue to grow in size, they likewise grow in complexity. Nowadays, it is rare for networks to contain devices that were all produced by the same manufacturer. More likely, whether because of price, availability, or otherwise, a given network will contain a mixture of computers and appliances, produced by various manufacturers. Furthermore, the wide selection of central processing units, audio and video components, storage devices, and other support hardware available for both computer systems and peripherals has enabled custom configuration of systems tailored to meet particular needs.

Unfortunately, however, from a network administration or management perspective, the more diverse a network is, the more difficult it is to manage due to the varying hardware and software configurations utilized by the varying devices or clients. Traditionally, when a networked device ceased to function on a network, the network administrator would personally visit the device to troubleshoot the cause of the malfunction. In a large network containing many clients, however, the process of locating a client, not to mention the process of troubleshooting, can be time consuming and therefore costly.

Remote management tools have been developed as part of an effort to decrease the total cost of ownership of networked systems by increasing their manageability. Typically, remote management tools provide system administrators with a means for detecting client malfunctions located remotely from the administrator. Unfortunately though, the notification that the administrator receives may be limited merely to an indication of whether an event has occurred, rather than a preferred notification indicating what type of event has occurred. Likewise due to the varying degree of customization within network devices, the event notification may not be tailored to the specific device that generated the event. Thus, an improved approach to event notification is desired.

Furthermore, although remote detection of a malfunction may be possible using a management tool, a personal visit by an administrator remains necessary in order to attempt to remedy the problem. Although notification of a malfunction or system alert is important, it is also desirable to have the capability to remotely act on the information to correct a failing condition. Since a large portion of malfunctions cause client operating systems to "hang", "freeze" or "lock-up", it is further desirable for a mechanism that provides the ability to perform remote operations on a client after boot, to also provide the ability to perform such operations when the client is without a functioning operating system, or in pre-boot state.

SUMMARY OF THE INVENTION

A system is provided to detect alert events on a client using a platform independent agent integrated with the client. The system is further provided to report detected alert events by the platform independent agent to a remote alert proxy in a platform independent manner complemented by a platform type. The system is further provided to translate the reported alert events to platform specific alert events by the alert proxy.

BRIEF DESCRIPTION OF THE DRAWINGS

The invention is illustrated by way of example, and not by way of limitation in the figures of the accompanying drawings in which like reference numerals refer to similar elements.

FIG. 3A is a block diagram illustrating one embodiment of an input pin connection scheme on a first system.

FIG. 4B is a table illustrating one embodiment of variables used by the alert proxy.

FIG. 5A illustrates a sample event description file containing event data for different platforms.

FIG. 6A illustrates a sample event description file containing control operation information and BIOS configuration data.

FIG. 6B illustrates one embodiment of a sample BIOS string table.

FIG. 8 illustrates one embodiment of a RMCP management transmit packet format.

FIG. 9 illustrates one embodiment of a RMCP management receive packet format.

DETAILED DESCRIPTION

Figure 1:
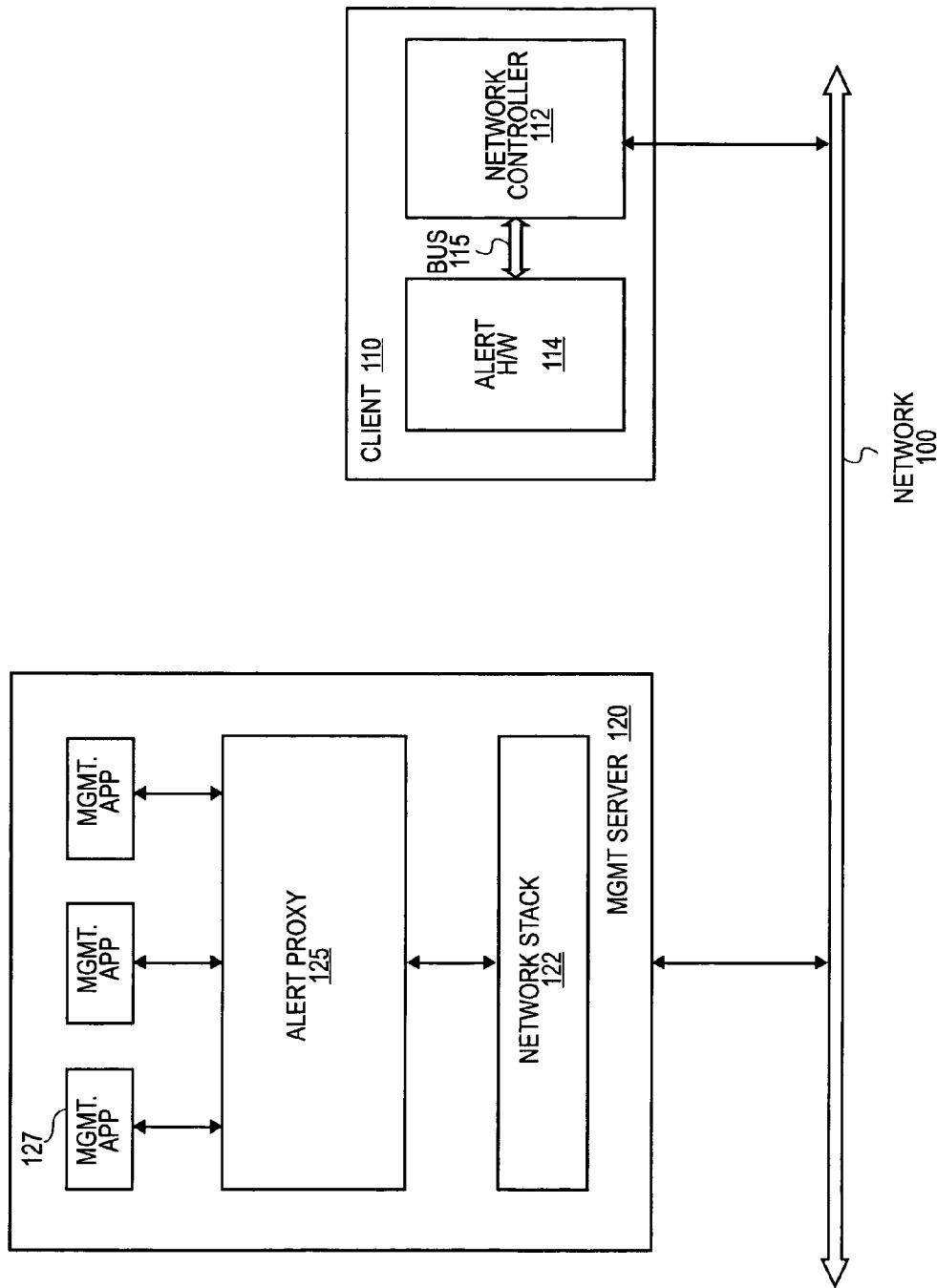
FIG. 1 is a block diagram illustrating one embodiment of a network alerting system.

In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for the reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, although the present invention may be described with reference to a particular programming language, it will be appreciated that a variety of programming languages may be used to implement the teachings of the invention as described herein.

Although all or some of the operations may be performed by software executing on one or more processing devices (e.g., CPUs), on a computer system or specialized apparatus, some or all of these operations may be performed by digital logic and/or circuitry, an integrated circuit (e.g., ASIC) or other semiconductor substrates.

Brief Overview

Network alerting, as described herein, refers to a network device's ability to perform problem identification, notification, and resolution. In one embodiment of the present invention, a software-based intermediary referred to herein as an alert proxy is used to transform binary, device-specific event or alert data into user-friendly plain text explanations of the event. In one embodiment, a management device containing the alert proxy is able to return a contextually correct description of the event to an administrator or other interested party based upon the characteristics of the specific device initiating the event. In one embodiment, event data is generated by alert software executing on an alert-enabled managed client, whereas in another embodiment, event data is generated by alert hardware embodied within an alert-enabled managed client.

In another embodiment of the present invention, the alert proxy translates generic, management-based command data received from a management application/agent into specific client-based hardware control data. The alert proxy transmits a data packet containing the hardware control data over a network to an alert-enabled managed client. Alert hardware within the alert-enabled managed client parses the hardware control data into control bits and utilizes the control bits to set or clear registers within the alert-enabled managed client so as to effectuate the specified control operations.

In another embodiment of the present invention, a network-alert client transmits a data packet over a network requesting specific alert detection and management parameters from a centralized configuration server. The configuration server responds supplying the network-alert client with the requested data. Using the received alert detection and management parameters, the network-alert client formulates a second data packet to be transmitted to the alert proxy upon the occurrence of an event. In such a manner automatic, unattended, simultaneous configuration of multiple network-alert clients is made possible.

FIG. 1 is a block diagram illustrating one embodiment of a network alerting system. Referring to FIG. 1, management server 120 and alert-enabled managed client 110 are shown connected to a network 100. Network 100 may represent a local area network (LAN), a wide area network (WAN), the Internet, or any other interconnected data path across which multiple devices may communicate. In one embodiment, network 100 is an Ethernet based network utilizing the transmission control protocol/internet protocol (TCP/IP). In another embodiment, network 100 utilizes the user datagram protocol/internet protocol (UDP/IP). It will be apparent to one of ordinary skill in the art, however, that various network and communication protocols could equivalently be implemented without departing from the spirit and scope of the present invention. Similarly, although management server 120 and alert-enabled managed client 110 are shown physically connected to network 100, any such connection means known in the art may be implemented including wireless technology such as infrared, radio frequency and microwave transfer means.

In the present disclosure, the term "packet" is generically used to represent data transmitted or received over a network and should not be interpreted as being specific to any particular topology or communication protocol. Likewise, in the present disclosure, the terms "event" and "alert" are used interchangeably to represent a particular type of data packet or message. Additionally, the term "event" is also used to represent a particular occurrence or change of state in a device.

In one embodiment of the present invention, alert-enabled managed client 110 represents a device equipped and configured to detect and transmit events to management server 120. In one embodiment, alert-enabled managed client 110 is equipped and configured to detect and transmit events while in a pre-boot or operating system unavailable mode. In one embodiment, as depicted in FIG. 1, alert-enabled managed client 110 represents a general purpose digital computer, whereas in another embodiment, alert-enabled managed client 110 may represent a peripheral device such as a printer or mass storage unit. In yet another embodiment, alert-enabled managed client 110 may represent an intelligent networked appliance such as a microwave oven, refrigerator, or a system such as an environmental heating ventilation air conditioning (HVAC) system, a burglar alarm system, a sprinkler system and the like.

Alert-enabled managed client 110 is shown having network controller 112 and alert hardware 114 of the present invention. Network controller 112 represents a device capable of establishing a communication link between alert-enabled managed client 110 and network 100. In one embodiment, network controller 112 is an 82559 multifunction fast Ethernet LAN controller available from Intel Corporation of Santa Clara, Calif. Alert hardware 114 represents logic equipped to detect alerts on alert-enabled managed client 110 and to formulate one or more network data packets representing those alerts. In one embodiment, as shown in FIG. 1, alert hardware 114 and network controller 112 represent two distinct components connected through system management bus (SMBus) 115, whereas in another embodiment, alert hardware 114 and network controller 112 may be integrated into a single ASIC. Similarly, both alert hardware 114 and network controller 112 may each be located on a motherboard or on one or more separate add-in expansion cards such as a network interface card (NIC).

Management server 120 is shown connected to network 100 and comprises network stack 122, alert proxy 125 of the present invention, and management application 127. In one embodiment of the present invention, management server 120 is a general purpose digital computer configured to execute alert proxy 125 and management application 127. Management application 127 represents any one or more of the various system management applications known in the art to be able to manage multiple clients over a shared network. In one embodiment, management application 127 represents any one or more applications from the LANDESK® suite of management products, available from Intel Corporation.

Alert proxy 125 represents an intermediary configured to perform numerous tasks including translating platform independent alert packets generated by alert-enabled managed client 110 into platform specific alert explanations. Additionally, alert proxy 125 translates control commands from management application 127 into hardware-specific data control packets to be transmitted to alert-enabled managed client 110. Alert proxy 125 can also perform tasks including, but not limited to discovering clients, identifying different hardware configurations and message formats, sending and receiving network packets for event configuration and control purposes, and providing a consistent external interface to management applications. In one embodiment, alert proxy 125 includes a plain-text ".ini" description data file (not pictured), whereas in other embodiments, alert proxy 125 includes description files based upon the management information format (MIF) and/or management information block (MIB) format. A more detailed description of alert proxy 125 may be found below.

Network stack 122 which is also shown as part of management server 120, do represents an optional TCP/IP-based network stack and supporting hardware device drivers necessary for management server 120 to communicate over network 100. It will be apparent to one of ordinary skill in the art, however, that various network communication protocols and hardware device drivers could equivalently be implemented.

Figure 2:
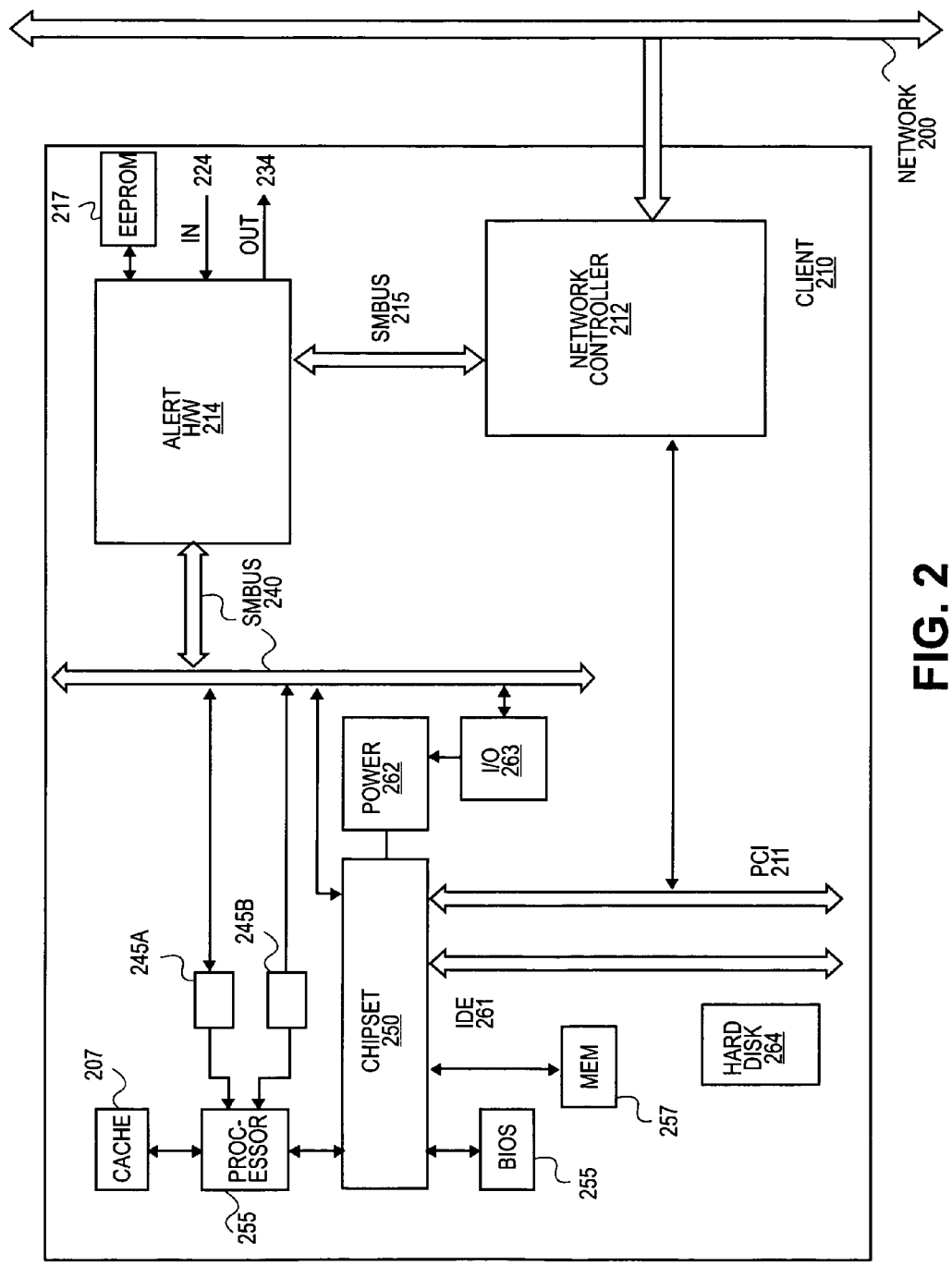
FIG. 2 is a block diagram illustrating one embodiment of an alert-enabled managed client.

FIG. 2 is a block diagram illustrating one embodiment of an alert-enabled managed client. Client 210 represents an alert enabled managed client and includes processor 255 coupled to chipset 250. In one embodiment, processor 255 is a processor from the Pentium® family of processors including the Pentium®, Pentium® Pro, Pentium® II, and Pentium® III processors available from Intel Corporation. Alternatively, other processors known in the art may also be used. Additionally, processor 255 may include a first level (L1) cache (not shown), and/or second level (L2) cache memory 207. The L1 and L2 cache memories may be integrated into a single device such as processor 255, or one or both may be omitted entirely.

Chipset 250 connects BIOS 255 and main memory 257 to processor 255. In one embodiment, chipset 250 is a 440PCIset series PCI chipset available from Intel Corporation, although various other chipsets known in the art may be employed. Main memory 257 and cache memory 207 store sequences of instructions that are executed by processor 255. In one embodiment, main memory 257 includes dynamic random access memory (DRAM), however, main memory 257 may comprise other configurations. The sequences of instructions executed by processor 255 may be retrieved from main memory 257, cache memory 207 or some other storage device such as hard disk 264 via IDE bus 261. Additionally, multiple processors (not shown) may be connected to chipset 250 as well as one or more video devices such as a cathode ray tube (CRT) or liquid crystal display (LCD) (neither shown).

Chipset 250 may also be connected to additional bus structures such as SMBus 240 and PCI bus 211. In one embodiment, network controller 212 is connected to chipset 250 through PCI bus 211. Network controller 212 is also connected to alert hardware 214 by way of SMBus 215, as well as network 200 which is identical to network 100 shown in FIG. 1.

SMBus 240 connects alert hardware 214 to sensors 245 and input/output unit 263. In one embodiment, input/output unit 263 is a general purpose input/output (GPIO) device, whereas sensors 245 are implemented using a Heceta 4 environmental IC to detect fluctuations in system voltages and temperatures, as well as CPU and cooling fan integrity. If an event such as, for example, a cooling fan failure is detected by sensors 245, alert hardware 214 is able to detect the event through SMBus 240.

EEPROM 217 is connected to alert hardware 214 and provides the alert hardware with various default configuration data. In one embodiment, EEPROM 217 is a Microwire™ compatible electrically erasable programmable read-only memory that holds data about the alert hardware's default packet format, default register values, and SMBus device polling information. In one embodiment, alert hardware 214 polls SMBus 240 for events by comparing SMBus address and register data loaded from EEPROM 217 against a bit mask using a logical AND function.

Software executing on client 210 can similarly generate events on alert hardware 214 by writing to certain registers (not pictured) included in alert hardware 214. BIOS 255 for example, may be connected to, and write POST codes to alert hardware 214, whereby the codes are thereafter encapsulated in an event message packet and sent to alert proxy 125 for interpretation. Alert hardware 214 can also detect events generated on signal lines connected directly to the alert hardware. One embodiment of such signal lines is depicted in FIG. 2 as input pins 224 and output pins 234 which are shown connected to alert hardware 214. Both input pins 224 and output pins 234 may be implemented using a GPIO device connected to alert hardware 214. In one embodiment, GPIO 263 may be connected directly to alert hardware 214 rather than SMBus 240. One or more of input pins 224 may be connected to one or more sensors that monitor system conditions. Similarly, one or more of output pins 234 may provide signals to effectuate control data received from management server 120.

In one embodiment of the present invention, alert hardware 214 may be connected to power source 262 through output pins 234, or in another embodiment, power source 262 may be connected to GPIO device 263 as shown in FIG. 2. A signal line from alert hardware 214 or GPIO 263 may also be connected to a power signal trace on the motherboard of client 210, such that management server 120 may cause alert hardware 214 to perform remote power functions on client 210 by way of a network control data packet. Similarly, a signal line from alert hardware 214 or GPIO 263 may be connected to a reset pin of the processor of client 210, such that management server 120 may effectuate a remote system reset on client 210 by way of a network control data packet. In one embodiment, the stimulus for such remote power/reset operations is an Remote Management & Control Protocol (RMCP) data packet sent from alert proxy 125 to alert hardware 214 (discussed below). In an alternative embodiment of the present invention, power/reset operations are effectuated by alert hardware 214 using the Simple Network Management Protocol (SNMP—defined in Request for Comments (RFC) 1157).

Figure 3B:
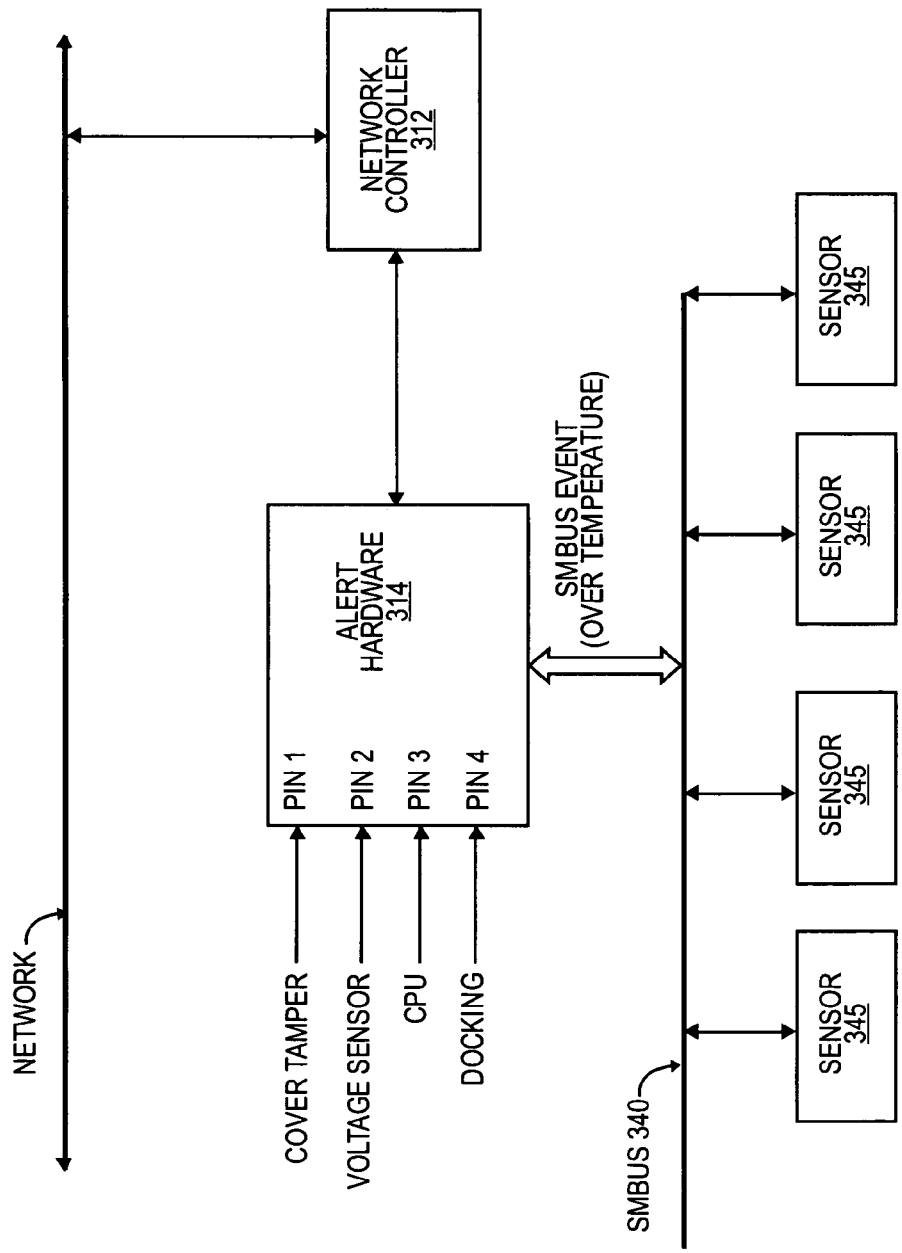
FIG. 3B is a block diagram illustrating one embodiment of an input pin connection scheme on a second system.

FIG. 3A is a block diagram illustrating one embodiment of an input pin connection scheme on a first system, whereas FIG. 3B is a block diagram illustrating one embodiment of an input pin connection scheme on a second system. It is to be appreciated that additional pin connection schemes other than those illustrated may equivalently be implemented without departing from the spirit and scope of the invention. Referring to FIG. 3A, alert hardware 314 is shown connected to network controller 312 and SMBus 340 having sensors 345. Alert hardware 314 is also shown having four input pins (pin 1, pin 2, pin 3, and pin 4) connected to four corresponding switches or sensors. In FIG. 3A, a cover tamper switch is connected to pin 1, a fan sensor device is connected to pin 2, a CPU monitoring device is connected to pin 3, and a link loss sensor is connected to pin 4. If the cooling fan in the system containing alert hardware 314 as shown in FIG. 3A were to malfunction, the associated fan sensor would detect the malfunction and notify alert hardware 314 by exerting a signal on pin 2 of alert hardware 314. Similarly, if an SMBus sensor 345 detected that a device located on SMBus 340 was operating outside of a prescribed voltage range, for example, a corresponding SMBus event would be registered on alert hardware 314 through the SMBus. In one embodiment, alert hardware 314 periodically polls sensor 345 to detect environmental alert conditions.

Referring now to FIG. 3B, alert hardware 314 is shown having a slightly different input pin connection scheme as compared to that of the system depicted in FIG. 3A. In FIG. 3B, input pin 1 is connected to a cover tamper switch, pin 2 is connected to a voltage sensor device, pin 3 is connected to a CPU monitoring device, and pin 4 is connected to a docking station presence switch. In the system depicted in FIG. 3B, if some aspect of the system was operating out of a prescribed voltage range, for example, a corresponding sensor would detect the condition and register the event on pin 2 of alert hardware 314. Similarly, if a SMBus sensor 345 were to detect that a device was running outside of a prescribed temperature range for example, the sensor would notify alert hardware 314 of such a condition over SMBus 340. Thus, where the system depicted in FIG. 3A has pin 2 connected to a fan sensor, the system depicted in FIG. 3B has pin 2 connected to a voltage sensor.

Therefore, pin 2 of one alert-enabled system registers a cooling fan malfunction, while pin 2 of another alert-enabled system registers an out of range voltage reading. In order for management application 127 to correctly identify the malfunction, alert proxy 125 (discussed in more detail below) is utilized to translate signal data generated by alert hardware 314 into an appropriate, device-specific event description.

Data Formatting

Once an event is detected by alert hardware 314, the event is encapsulated into a data packet and transmitted across a network. In one embodiment of the present invention, RMCP is the protocol used to encapsulate event data to generate the data packet. In another embodiment of the present invention, SNMP is the protocol used to encapsulate and transmit the data packet. It should be noted, however, that the present invention is not limited to these two specific protocols, but rather any protocol that encapsulates and transmits the various alert events in a consistent manner so as to preserve the flexibility and extensibility of the alert hardware 314 while providing a consistent interface to management applications 127 may be used.

Event Data Parsing

Figure 4A:
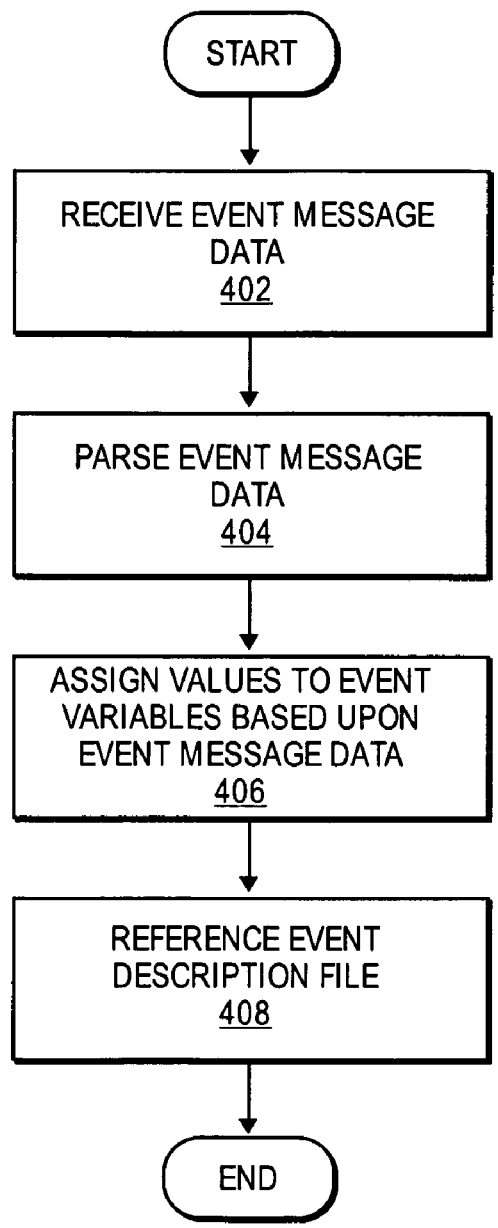
FIG. 4A is a flow diagram illustrating the operation of one embodiment of an alert proxy.

FIG. 4A is a flow diagram illustrating the operation of one embodiment of an alert proxy. Referring to FIG. 4A while making reference to FIG. 1, once an event is detected and a data packet is composed by alert hardware 114, network controller 312 sends the packet over network 100 to be received by management server 120 comprising alert proxy 125. Typically the data will be formatted into a binary string having predefined field lengths, but it will be apparent to one of ordinary skill in the art, however, that various other formats could equivalently be implemented. Once alert proxy 125 receives the binary data as indicated by processing block 402, alert proxy 125 parses the data according to the particular data encapsulation protocol to decipher its contents, as indicated by processing block 404. In one embodiment, the data encapsulation protocol used is RMCP (discussed below). After the data has been deciphered, the alert proxy assigns values to predetermined variables or tokens accordingly at processing block 406. Using the values assigned to the variables or tokens, the alert proxy references an event description file at processing block 408.

FIG. 4B is a table illustrating one embodiment of variables used by the alert proxy. Referring to FIG. 4B, message type 422 is used to identify the specific alert hardware configuration implemented within the client, and system ID 424 is used to identify the specific class of platforms to which the client belongs. In one embodiment, a class of platforms are those platforms that are wired identically with respect to event alerting functionality. In one embodiment, the system ID 424 draws an association between a particular client and a list of consistent POST codes capable of being generated by the client. UUID 426 is a universal unique identifier also known as a globally unique identifier (GUID). In one embodiment, the UUID is a 128-bit number intended to uniquely identify a system on a network. Event type 428 represents internal events generated on the alert hardware and indicates whether an event is a "simple", "software" or "compound" event. An event is a "simple" event if it maps directly to any of the events specified in the event list (discussed below), whereas an event is a "compound" event if a second level of indirection is performed to obtain an event list mapping. A "software" event is an event that is generated internally by software executed on the client. Message variable 430 is typically used with software-type events and may contain additional information provided by the client software, although other uses are possible.

Event extension 432 provides additional descriptor data that enables the second level of indirection used by compound events, and event data field 434 may contain additional event-related information to be used by the alert proxy. A fewer or greater number of variables may be utilized without adversely affecting the operability of the invention.

The Alert Proxy

As mentioned above, once the event data is parsed and variables are assigned value, an event description file is referenced by the alert proxy. In one embodiment of the present invention, the event description file is implemented via a machine readable ".ini" configuration file. In one embodiment, the description file is broken down into distinct sections each having a distinct section heading.

Figure 5B:
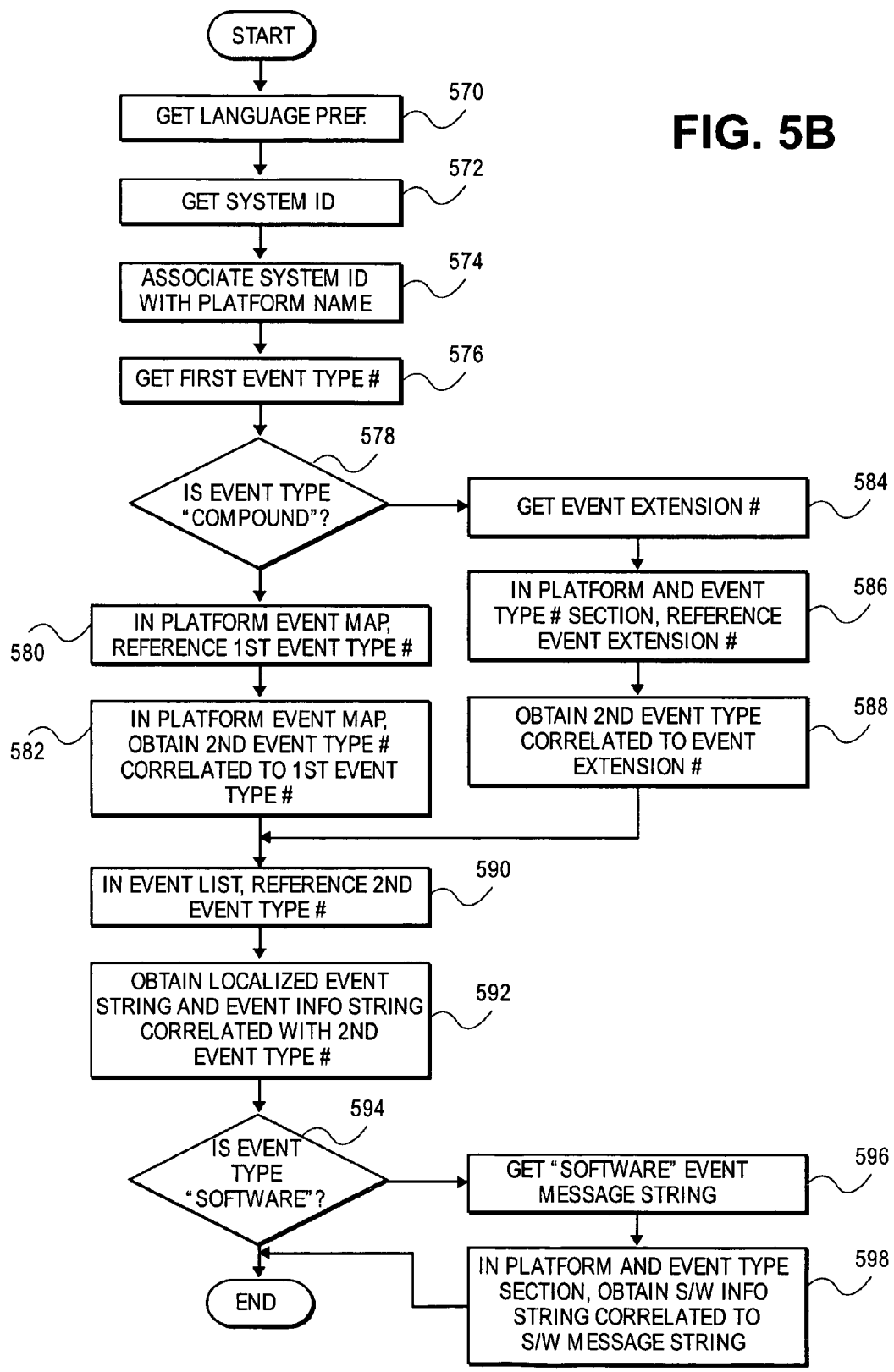
FIG. 5B is a flow diagram illustrating the operation of one embodiment of an alert proxy with respect to an event description file.

FIG. 5A illustrates a sample event description file containing event data for different platforms. FIG. 5B is a flow diagram illustrating the operation of one embodiment of an alert proxy with respect to the event description file shown in FIG. 5A. Referring to FIGS. 5A and 5B together, after referencing the event description file, the alert proxy begins by identifying a preferred language to display event descriptions when descriptions are not available in the localized language, as indicated by reference number 505 and processing block 570. If, for example, the localized language is Mexican Spanish ("esm") and an event description is only available in the Native Spanish ("esp") dialect, language_map section 505 is used to indicate that such a substitution would be acceptable.

At processing block 572, the alert proxy obtains system identification data from the data packet and references System ID section 510 in the event description file. System ID section 510 is used to map an alphanumeric system identification string to a more familiar textual representation of the specific platform-type. In one embodiment, the platform-type is represented by the name of original equipment manufacturer (OEM) to which the system belongs. Once the system identification is mapped to an OEM name, as indicated by processing block 574, the alert proxy can thereafter reference platform-specific information by referring to the OEM-specific section in the event description file. Such platform-specific information includes but is not limited to BIOS POST codes, watchdog status, event maps and other information. In FIG. 5A, System ID "XXX" maps to "CompanyXYZ" at reference line 511, whereas System ID "YYY" maps to "CompanyABC" at reference line 512. In one embodiment, both "XXX" and "YYY" represent numerical system identification strings as assigned by the alert hardware.

At processing block 576, the alert proxy obtains data representing a first event-type from the parsing process described above. Event_type section 520, shown in FIG. 5A, contains a list of event identifications and their corresponding event types or classifications. The event identifications are assigned by the alert hardware to symbolically represent detected events. In one embodiment, as depicted in FIG. 5A, the event identifications are represented numerically. Entries in the Event_type section indicate whether a particular event may be categorized as a "simple", "software", or "compound" event as described above.

Referring again to FIG. 5A, reference line 521 indicates a "simple" event-type while reference lines 522 and 523 indicate "software" and "compound" event-types respectively. At processing block 578, the alert proxy begins to classify the event by first determining if the event is "compound." If the event is not compound, it can be classified as either "simple" or "software." If an event is categorized as "simple" or "software" such as in lines 521 and 522 respectively, the alert proxy continues by referencing Event_map section 530 indicated by processing block 580. Event_map section 530 contains a matched list of "simple" or "software" events associated with each platform. In one embodiment, the events are specified as ordered pairs of integers that are used to identify particular events on a given platform as indicated by reference number 531.

At processing block 580, the alert proxy references a first event type in event_map section 530. At processing block 582, the alert proxy obtains a second event type that is correlated to the first event type by the event map. The event map provides a means for the alert proxy to correlate a platform-specific event to a context sensitive event description. At reference line 531, CompanyXYZ has its first event specified by the ordered pair "1,2". The first component in the ordered pair is an internal representation of the event as classified by the alert hardware, whereas the second element of the ordered pair represents the event type that a management application is notified with. In one embodiment, the "1" indicates the value specified in the Event_type field of the RMCP packet. By using Event_map 530, the alert proxy can obtain a direct mapping between a platform-specific event and a context-sensitive event description. In the case of "1,2" the alert proxy would use the event description strings matched with event "2" (as indicated by reference number 541 in Event_list 540) to describe the event.

Unlike a "simple" or "software" event, a "compound" event, however, requires a two-step lookup to determine the second event type. When the alert proxy receives a data packet containing an event type of "90", the alert proxy references the event description file and identifies that the event is "compound," as indicated by reference number 523. Since the event is compound, the alert proxy obtains "event extension" data from the parsed data packet and uses the event description data to lookup the second event type. After obtaining the event extension data at processing block 584, the alert proxy references a "compound" event-specific section in the event description list, as indicated by processing block 586. In one embodiment the "compound" event-specific section is identified by a concatenation of the OEM platform name with the "compound" event number. Referring again to FIG. 5A, compound event 523, for example, would therefore cause a lookup of the CompanyXYZ__90 section, as indicated by reference number 550.

At processing block 588, the alert proxy obtains a second event type that is correlated to the first event type. An example of this is shown by reference number 551, where "7=8" indicates that a "compound" event registering a first event type "7" on the CompanyXYZ system, should be treated as a second event type "8" when referencing the Event_list section 540 (discussed below). In the case where multiple event entries exist under the CompanyXYZ_90 section, the alert proxy would again use the event extension field to determine entry with which to reference. Reference line 552 indicates a second entry, "9=10", listed under the CompanyXYZ_90 section in addition to the "7=8" entry. If the event extension field within the RMCP data packet contained the value "9", the alert proxy would reference event "10" in the Event_list 540.

Event_List section 540 contains a list of second event types along with their associated localized strings and event information strings. The Event_list section in conjunction with the Event_map section uniquely identify an event.

At processing bock 590, the alert proxy references the event list using the second event type to obtain a localized event string and its correlated event information string. Reference number 541 illustrates that second event type "1" has "13001" as its localized event string, and "14015" as its event information string. In one embodiment, the event information string "14015" indicates that a client is no longer available, while localized event string "13001" indicates that the client is no longer available because its cover has been tampered with. Both the localized event string and the event information string provide user-friendly descriptive information regarding supported events and may be adapted to include additional event strings as desired.

A "software" event would be treated substantially similar to a "simple" event as described above. In addition to the processing operations described above with respect to a "simple" event, a "software" event involves two additional operations. Once the event is identified as a "software" event by the alert proxy at processing block 594, the alert proxy obtains software-related event message data that may be within the data packet.

At processing block 596, the alert proxy obtains a software-related message string and references a "software" event-specific section in the event description list at processing block 598. In one embodiment the "software" event-specific section is identified by a concatenation of the OEM platform name with the "software" event number as indicated by reference number 565. At processing block 598, the alert proxy obtains a special software information string that is correlated to the software message string in the specially-named software section.

BIOS Interaction

The alert proxy disclosed herein provides a mechanism by which one system's BIOS POST codes and associated descriptions may be distinguished to reflect the fact that the POST codes generally vary from one manufacturer to another. As described above, the alert proxy is equipped to translate encapsulated BIOS POST codes received from an alert-enabled managed client into descriptive solution strings or messages that may be used by an administrator. In one embodiment, when the alert proxy receives a POST code from an alert-enabled managed client, it informs the management application of the appropriately mapped event description specific to that alert-enabled managed client.

Figure 7:
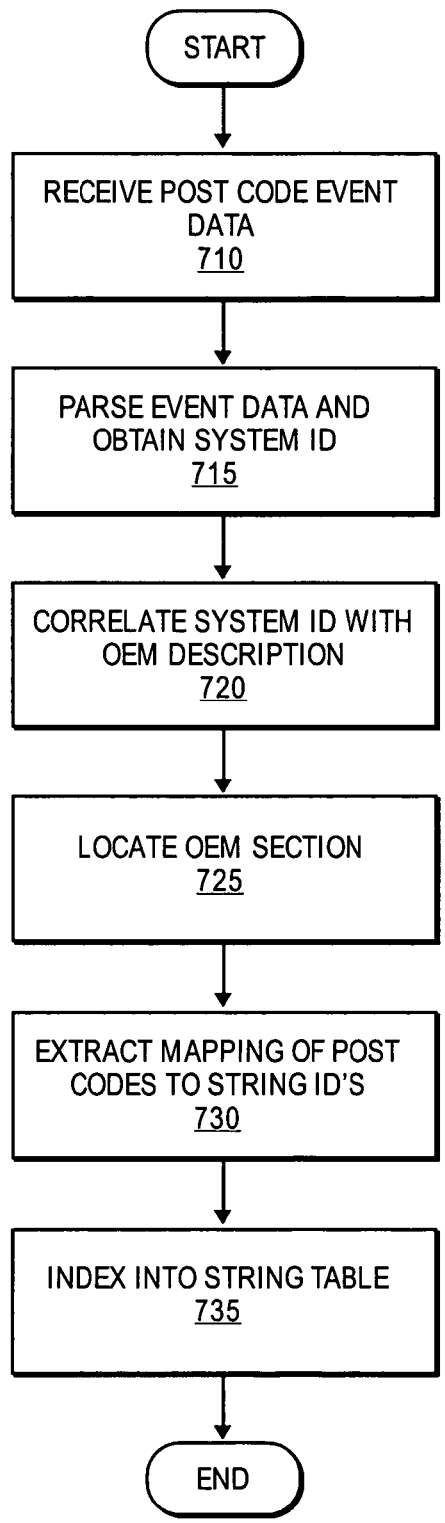
FIG. 7 is a flow diagram illustrating the operation of one embodiment of an alert proxy with respect to BIOS.

FIG. 7 is a flow diagram illustrating the operation of one embodiment of an alert proxy with respect to BIOS. Referring to FIG. 7, the alert proxy receives POST code event data from an alert-enabled managed client at processing block 710. Once received, the event data is parsed by the alert proxy at processing block 715. Among other data items, the alert proxy obtains a system ID and correlates it to a corresponding OEM-identifier within the event description file at processing block 720. At processing block 725, the alert proxy locates the appropriate OEM section in the event description file in order to extract a mapping of POST codes to string ID's at processing block 730. At processing block 735, the alert proxy indexes into a string table which contains a listing of string ID's and corresponding description strings. In one embodiment, the string table is implemented as a dynamic linked library (DLL).

FIG. 6A illustrates a sample event description file containing control operation information and BIOS configuration data, and FIG. 6B illustrates one embodiment of a sample BIOS string table. Referring to FIGS. 6A and 6B together, reference number 652 indicates that if a "CompanyXYZ" system returns a POST code of "101", a corresponding string ID of "300401" should be looked-up. With the use of the event description file, the proxy server is able to determine that code "101" from a "CompanyXYZ" system indicates "a failure occurred during testing of the system board", as shown by reference number 672 in FIG. 6B. The letter "I" preceding the string ID in FIG. 6A, indicates that the POST code is merely informational. Similar representations may be used to indicate when POST codes indicate warnings or critical events. Furthermore, multiple POST code strings as indicated by reference number 662, may be used to provide a generalized error message, while also providing more detailed explanation or solution strings when available. Such a mechanism allows the alert proxy to remain flexible and adaptable to specific implementation needs without time consuming customization.

Control Data

The alert proxy described herein is equipped to translate command data received from a management application into specific client-based hardware control data to effectuate various control operations such as power down, power up, reset, and reboot. In one embodiment, the alert proxy utilizes a plain text configuration file to translate command data into control data. In another embodiment, the alert proxy utilizes the event description file described above with respect to FIG. 5 to translate the command data into control data.

Referring once again to FIG. 6A, function_list section 610 contains a list of generic control functions representing operations that can be performed on an alert-enabled managed client. Such functions may include but are not limited to power down, power up, reset, and reboot on the alert-enabled managed client.

Subfunctions_2 section 630 contains a list of secondary functions that may be available for a given function. In general, a sub-function represents a specific operation that is related to a more broad "main" function appearing in function_list 610. In this example, subfunctions_2 indicated by reference number 630 represents specific sub-functions that are available for function number "2" indicated by reference number 616. Sub-functions "0" and "1" indicated by reference numbers 632 and 634 respectively, represent operations available for function "2". If, for example, function "2" indicates a CMOS operation, sub-functions "0" and "1" may represent "set" and "clear" operations.

The function list and function map sections are similar to the event list and event map sections discussed above.

Whereas the event list and event map are used to interpret events from an alert-enabled managed client, the function list and function map are used to perform control operations on an alert enabled managed client. In one embodiment, the alert proxy uses the function list to perform control operations on a client while the client is in a pre-boot or operating system unavailable state.

Function_map section 620, represents functions supported on a given platform. In one embodiment, as indicated by reference number 622, the data in the function map appears as ordered pairs of integers. In one embodiment, the first integer is a generic external representation of the function as provided in the function_list section (described above), and the second integer is an internal representation of the event that may differ depending upon the particular platform involved.

In another embodiment, the data in the function map may be organized as a delimited string of integers consisting of multiple tuples, each containing two integers. For example, "0=45,4; 46,7; 47,9" might indicate that a function "0" sets a register "45" within the alert hardware with the value "4", register "46" gets set with the value of "7", and register "47" gets set with a value of "9".

In one embodiment, configurable output pins 234 shown in FIG. 2 are used to effectuate the control operations or functions discussed above, whereas in another embodiment, dedicated signal lines may be coupled directly to the alert hardware to achieve the same result. Because alert hardware connection schemes may vary depending upon the particular platform and specific implementation, the alert proxy is used to translate a generic control operation description into a device-specific control operation.

RMCP Transmit Packet

The alert technology disclosed herein enables a networked system to notify, be managed, and be remotely controlled through a network connection via directed network data packets. The Remote Management & Control Protocol (RMCP) defines one mechanism that enables such functionality on an alert-enabled managed client. Specifically, RMCP provides alerting (e.g. environmental, security, etc.), reliability via sequencing and acknowledgements, control operations (e.g. remote reset, power-up and power-down), and remote state monitoring.

The alert hardware of the present invention is equipped to encapsulate data, prior to its transmission, in a number of formats including RMCP and SNMP. In one embodiment, the alert hardware formulates an RMCP message in RAM prior to its transmission, however, in other embodiments, RAM is not utilized. Once the event message is formed, the alert hardware causes the message to be transmitted by the network controller to the alert proxy for interpretation. As described above with respect to FIGS. 4A and 4B, upon receipt of the event message, the alert proxy parses the message and assigns values to predetermined event variables based upon the message contents.

FIG. 8 illustrates one embodiment of a RMCP management transmit packet format. Referring to FIG. 8, transmit packet 800 is divided into various main data fields including: Media Access Control (MAC) header 805, Internet Protocol (IP) header 810, UDP header 815, RMCP header section 820, and RMCP data section 830. MAC header 805 contains the various data fields as specified under the IEEE 802.3 standard, published in 1996 and available from the IEEE Standards Department, Copyright Information, 445 Hoes Lane, P.O. Box 1331, Piscataway, N.J. 08855-1331. IP header 810 contains the various data fields required by RFC 1042 which addresses using IP over an IEEE 802 network. UDP header 815 contains various fields including a source port field, a destination port field, a length field, and a checksum field.

RMCP header section 820 includes message type field 822, a reserved field 824, sequence field 826, and class field 828. Message type field 822 indicates to the alert proxy the specific alert hardware configuration implemented within the client. In one embodiment, "message type 3" indicates that the alert hardware is capable of interpreting RMCP and can send "compound" messages. Reserved field 824 is available for customization purposes. Sequence field 826 appears in both the RMCP transmit and RMCP receive packet formats, and allows data packets to be assigned a sequence or order number. A sequence number is useful in cases where the client receives multiple data packets temporally close together. By using a sequence number, the client can notify the originating device as to which packet the client is responding. Class field 828 is similar to message type field 822 in that class field 828 identifies the class or category to which the alert hardware belongs. Since different classes of hardware may provide different levels of functionality by way of software or hardware, both message type field 822 and class field 828 are at least used for backwards compatibility purposes.

Like the RMCP header section, RMCP data section 830 also contains various fields including: event code field 832, data length field 834, checksum field 836, and data field 839. Event code field 832 contains data that indicates the type of event that has occurred on the client as explained above with respect to FIGS. 4A, 4B and 5. If event code field 832 indicates that a "simple" event "1" has occurred, the alert proxy references the Event_map section of its description file to determine an appropriate direct event mapping. Data length field 834 is used to indicate the length of the RMCP data section that follows. In one embodiment, data length field 834 is assigned a fixed value representing a length of 46 bytes. Checksum field 836 appears in both the RMCP transmit packet format and receive packet format, but is used implemented differently in each. In the RMCP transmit data packet, the UDP checksum is used by the system rather than an RMCP-specific checksum that utilizes checksum field 836. In transmit mode therefore, the value of checksum field 836 is set equal to zero since the field remains unused. Data field 839 may contain data that provides additional event descriptions to be parsed and used by the alert proxy.

RMCP Receive Packet

The alert hardware is capable of receiving data that has been packaged, or encapsulated using a protocol such as RMCP. FIG. 9 illustrates one embodiment of a RMCP management receive packet format. Referring to FIG. 9, receive packet 900 is divided into multiple fields including: Media Access Control (MAC) header 905, Internet Protocol (IP) header 910, UDP header 915, RMCP header section 920, RMCP data section 930 and a cyclic redundancy check (CRC) field 940. MAC header 905, IP header 910, and UDP header 915 are included for reasons described above with respect to the RMCP transmit packet.

In the alert system disclosed herein, the network controller receives data packets before passing the packets through to the alert hardware. In one embodiment, upon receiving a data packet, the network controller employs a filter that verifies that the MAC address is correct. Once the alert hardware receives the data packet, the hardware determines whether the data packet is indeed an alert packet by ensuring that the packet indicates the correct UDP destination port. In one embodiment, the alert proxy and alert hardware communicate through UDP port 0x026F.

The RMCP header contains information used to implement reliable transport over UDP. RMCP header section 920 includes version field 922, sequence field 926, class field 928 and a reserved field 924. Version field 922 gives the alert proxy more information with respect to the specific hardware implementation by referring to the version number of the protocol that the alert hardware is capable of interpreting. In one embodiment, "version 3" indicates that the alert hardware is capable of interpreting RMCP and can recognize control operations from the alert proxy. Class field 928 is similar to the version field in that the class field identifies the class or category to which the alert hardware belongs. Sequence field 926 and reserved field 924 have the same functionality as their counterparts described above with respect to the RMCP transmit packet. In one embodiment, the alert header fields 922, 924, 926, and 928 are each defined to be one byte in length.

The RMCP data section contains specific details about a particular message and its associated fields. RMCP data section 930 includes type field 982, length field 984, checksum field 986, and data field 988 which may vary in length.

Event type field 982 specifies the type of control operation to be performed by the alert hardware. In one embodiment, available control operations may include system power-up, system power-down, reset and reboot. In one embodiment, the alert hardware uses multiple general purpose receive filters within the alert hardware to set and clear bits in the alert hardware register space. Since each general purpose filter is assigned its own event type, the BIOS and the alert proxy can work together using the filters to select one of multiple boot paths upon rebooting. Examples of such boot paths include safe boot, diagnostic mode boot, alternative operating system boot and pre-boot network load. Length field 984 indicates the length of data field 988 that follows. Data field 988 is used as a general purpose field that may contain additional data for use by software or additional bit masks to be used by the alert hardware. Checksum 986 is an RMCP-based checksum of the RMCP message and is calculated based upon the addition of IP source and destinations addresses, RMCP header, and RMCP data fields. In one embodiment, checksum 986 is used in lieu of a UDP checksum due to the large overhead required for calculating a UDP checksum. The UDP protocol states that the checksum should be a 16-bit one's complement of the one's complement sum of a pseudo header of information from the IP header, the UDP header, and the data. In a pre-boot or operating system unavailable state, a processor or similar hardware may not be available for computing such a complex UDP checksum. By substituting checksum 986, which looks for a constant value resulting from the addition of various data fields, RMCP is able to provide data integrity without unnecessary overhead.

State Based Security

The advantageous configuration of the managed client disclosed herein allows a proxy server to perform control operations remotely over a network connection, but it could also make the client vulnerable to viruses or other malicious attacks over the network. Although perhaps the best precaution to such attacks may be the use of authentication and encryption techniques, such methods generally prove to be expensive when implemented in silicon. One viable alternative to encryption and authentication is the use of a state-based security approach as disclosed herein.

A state-based security approach basically limits the performance of control operations on an alert-enabled managed client to a time when the alert-enabled managed client is unresponsive. In one embodiment of the present invention, control operations received from a management server are only accepted and acted upon by the alert hardware while the alert-enabled managed client is in a "system hung" state. In one embodiment, a countdown watchdog timer on the alert-enabled managed client is periodically reset or updated by the BIOS or operating system of the alert-enabled managed client under normal operating conditions. If the watchdog timer expires, it is an indication that the alert-enabled managed client has become unresponsive and a watchdog event is therefore triggered. In one embodiment, upon the expiration of the watchdog timer, the alert hardware transmits a description value indicating such a watchdog event to the management server for interpretation by the alert proxy.

Figure 10:
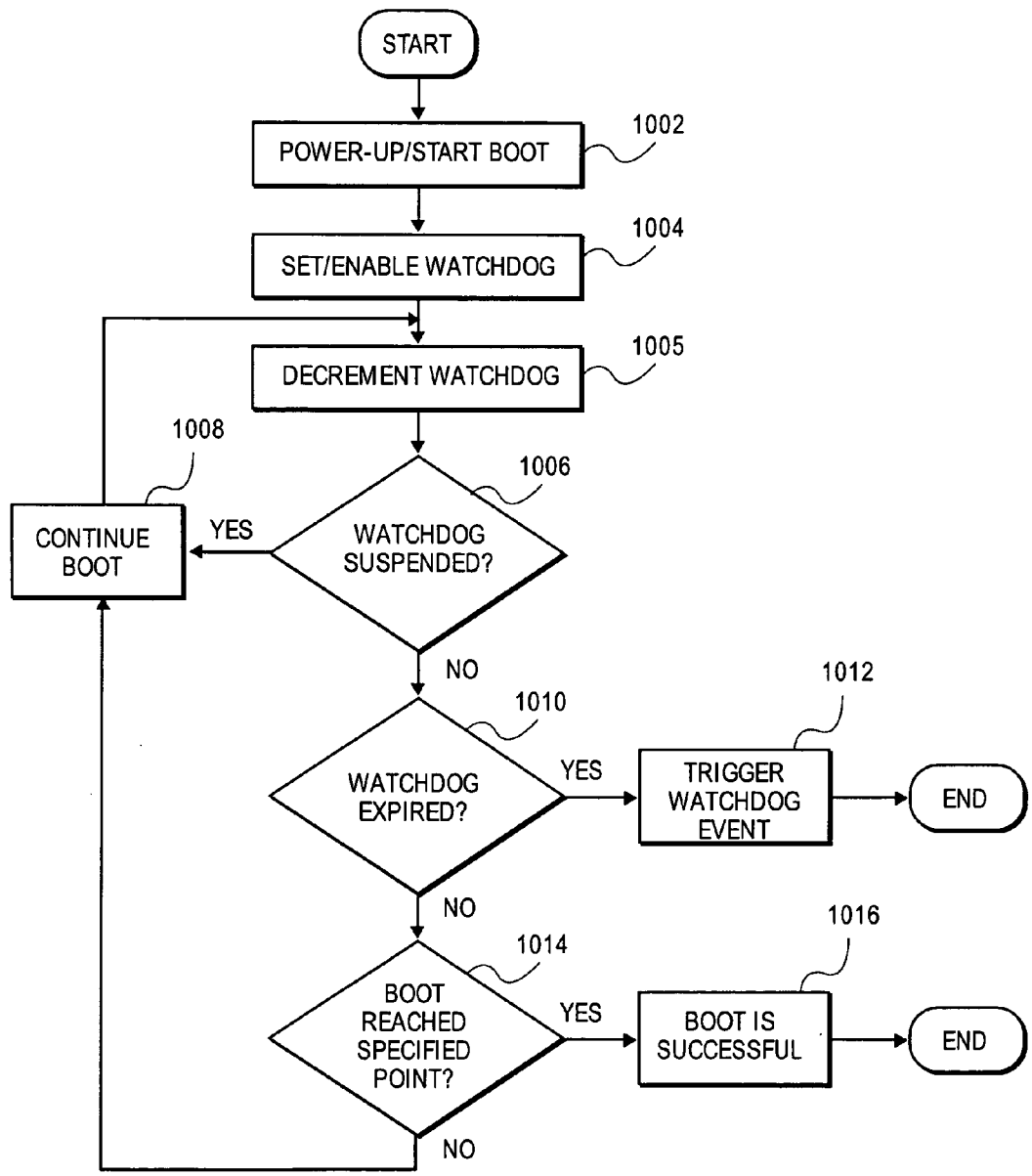
FIG. 10 is a flow diagram illustrating one embodiment of a managed client boot process with respect to a watchdog timer.

FIG. 10 is a flow diagram illustrating one embodiment of an alert-enabled managed client boot process with respect to a watchdog timer. Referring to FIG. 10, the alert-enabled managed client is powered-on or booted at processing block 1002, and the watchdog is enabled and initialized at processing block 1004. Once initialized, the watchdog timer begins to be decremented at processing block 1005. In one embodiment, the watchdog timer is implemented in the alert hardware via a watchdog register that contains a down-counting value when enabled.

At processing block 1006, the system checks to see whether the watchdog timer has been suspended. In one embodiment, the watchdog timer may purposely be suspended in order to allow certain processes that take indeterminate amounts of time, such as a POST ROM-scan, enough time to complete. If the watchdog timer has been suspended, the boot process nonetheless continues under normal conditions as shown by processing block 1008. If the watchdog timer has not been suspended, however, the alert hardware then determines whether the watchdog timer has expired at processing block 1010. If, at processing block 1010 the watchdog timer has expired, it is likely that some disruption occurred during the boot process and a watchdog event is thereby triggered at processing block 1012. If the watchdog timer has not expired at processing block 1010, the system determines whether the boot process has reached a predetermined point at processing block 1014. In one embodiment, the predetermined point is completion of the boot process, whereas in another embodiment, the predetermined point is anything but the completion of the boot process. If the boot process has not reached a specified point in the boot process, whether it be completion of the process or otherwise, the system continues to boot normally as indicated by processing block 1008. If, however, the system has reached a specified point in the boot process without the watchdog timer expiring, a successful boot has been achieved as indicated by processing block 1016.

The watchdog timer can also be used to indicate an operating system malfunction while in a post-boot mode. In one embodiment, the operating system continuously updates and/or resets the watchdog timer before the timer expires. If the operating system is unable to reset the watchdog timer, the timer will eventually expire and a watchdog event will be triggered. The watchdog event will be detected by the alert hardware which, in response, will notify the management server as described above. Accordingly, the management server is able to detect that the operating system has "hung" or is "frozen" since the watchdog timer was not updated.

Automatic Configuration

In one embodiment of the present invention, a networked client is automatically provided with one or more alert detection and management parameters to enable the device to communicate with an alert proxy while in a pre-boot, or operating system unavailable state so as to simplify installation within an alert-based system. In one embodiment, dynamic host control protocol (DHCP) is used to obtain the one or more alert detection and management parameters. In another embodiment of the present invention, the networked client is automatically provided with additional configuration data while in a post-boot state. By automating the client configuration process within an alert-based system, the total cost of ownership of such a system may be decreased.

Figure 11:
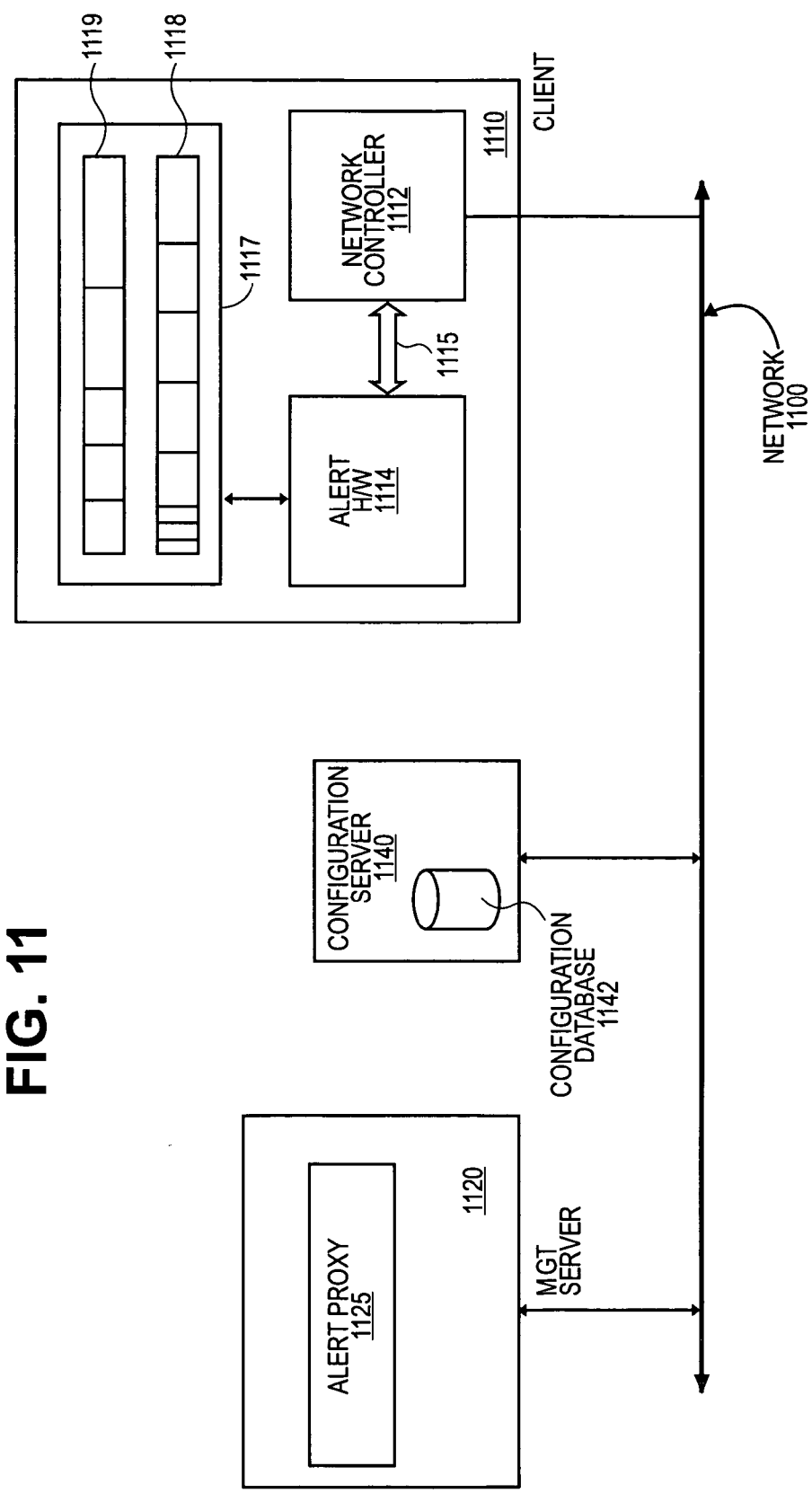
FIG. 11 is a block diagram illustrating one embodiment of an automatically configurable network alerting system.

FIG. 11 is a block diagram illustrating one embodiment of an automatically configurable network alerting system. Referring to FIG. 11, network 1100 is shown connected to networked client 1110, management server 1120, and configuration server 1140. Both networked client 1110 and management server 1120 contain architecture substantially similar to that of alert-enabled managed client 112 and management server 120 respectively, each described above with respect to FIGS. 1 and 2. Referring once again to FIG. 11, networked client 1110 is shown having network controller 1112 connected to alert hardware 1114 via system management bus 1115. In addition, EEPROM 1117 is shown connected to alert hardware 1114. Both network controller 1112 and alert hardware 1114, as well as EEPROM 1117 are substantially similar to their counterparts described above with respect to FIGS. 1 and 2. EEPROM 1117 is shown containing a first data packet 1118 and a second data packet 1119. In one embodiment, first data packet 1118 is a dynamic host configuration protocol (DHCP) formatted data packet, whereas second data packet 1119 is a RMCP formatted data packet. In an alternative embodiment, second data packet 1119 may be a SNMP formatted data packet or a DMI-based data packet.

For simplification, management server 1120 is shown to contain only alert proxy 1125, although it should be understood that additional management applications, optional configuration files, and device drivers may be present on management server 1120.

Configuration server 1140 is connected to network 1100 and contains configuration database 1142. Configuration server 1140 represents a device equipped to receive configuration requests from networked clients, such as networked client 1110, and in response to those requests provide specific configuration data stored in a database, such as configuration database 1142. In one embodiment, configuration server 1140 is a general purpose digital computer equipped to operate in such a manner.

Figure 12:
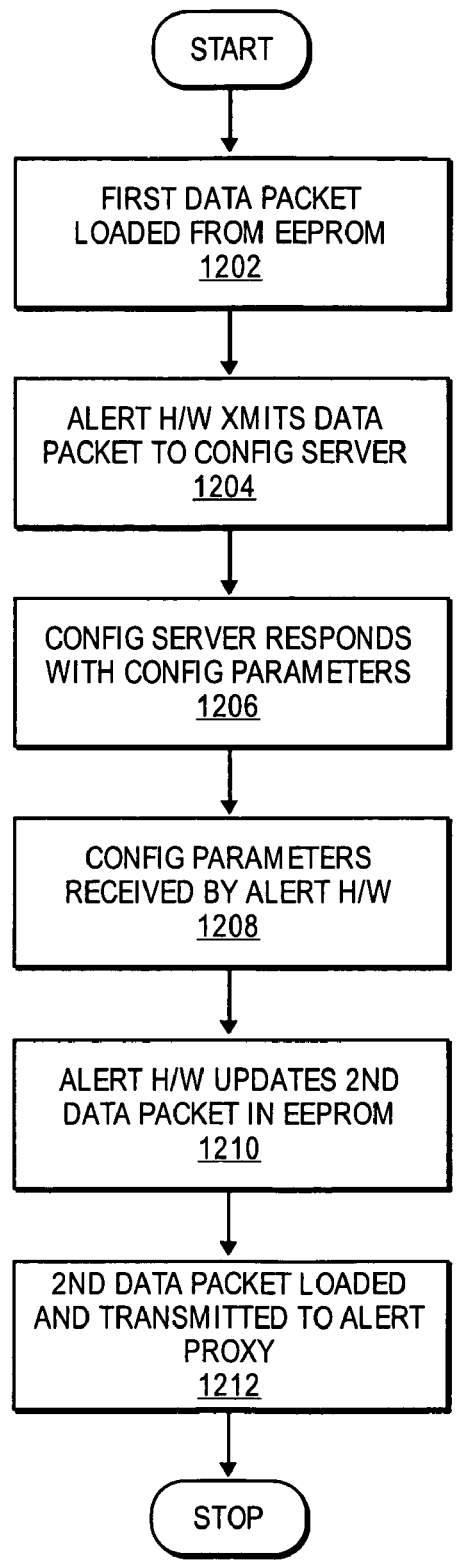
FIG. 12 is a flow diagram illustrating one embodiment of an automatic configuration process of a networked client.

FIG. 12 is a flow diagram illustrating one embodiment of an automatic configuration process of a networked client. Referring to FIG. 12, alert-based managed client 1110 loads first data packet 1118 from EEPROM 1117 into alert hardware 1114 at processing block 1202. Once first data packet 1118 is loaded into alert hardware 1114, it is transmitted to configuration server 1140 at processing block 1204. First data packet 1118 may be unicast to configuration server 1140 or broadcast across network 1100. In one embodiment, configuration server 1140 and management server 1120 may be combined into a single device connected to network 1100.

In one embodiment, data fields within first data packet 1118 are used by alert hardware 1114 to request certain alert detection and management parameters from configuration database 1142. In one embodiment, alert hardware 1114 requests a heartbeat interval, a watchdog interval, and an address, such as an alert proxy address, to which the alert hardware should send event data. In one embodiment, first data packet 1118 is a DHCP formed data packet, whereby alert hardware 1114 requests alert detection and management parameters using one or more user defined options fields specified under DHCP.

In response to receiving first data packet 1118, configuration server 1140 transmits a data packet containing at least one of the requested alert detection and management parameters to alert-based managed client 1110 at processing block 1206. Once alert-based managed client 1110 receives the alert detection and management parameters (processing block 1208), alert-based managed client 1110 uses those parameters to update second data packet 1119 stored in EEPROM 1117 at processing block 1210. In one embodiment, alert hardware 1114 includes specific alert hardware implementation data within second data packet 1119. After second data packet 1119 is updated and upon the occurrence of an event, alert hardware 1114 transmits second data packet 1119 containing event data to alert proxy 1125 at processing block 1212. Accordingly, automatic, unattended, simultaneous configuration of multiple alert-based clients is made possible.

Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

We claim:

1. A method comprising:
    detecting alert events on a client using a platform independent agent integrated with said client;
    reporting detected alert events by said platform independent agent to a remote alert proxy in a platform independent manner, wherein reporting said detected alert events further comprises:
        composing a network data packet, said network data packet including an event code, wherein said event code includes a BIOS POST code; and
        transmitting said network data packet including said event code to said remote alert proxy;
    sending command data to the remote alert proxy in response to the detected alert events;
    translating said reported alert events to platform specific alert events via said alert proxy by referring to a specific section of an event description file using the mapped representation; and
    translating the command data into specific client-based hardware control data to automatically perform hardware control operations on the client only while the client is in an unresponsive state.

2. The method of claim 1, wherein detecting said alert events on said client further comprises detecting alert events while said client is in a reduced function state.

3. The method of claim 2, wherein said reduced function state includes an operating system hung state.

4. The method of claim 1, wherein composing said network data packet comprises encapsulating said network data packet according to at least one of a plurality of encapsulation protocols including a remote management and control protocol (RMCP) and a simple network management protocol (SNMP).

5. The method of claim 1, wherein translating said reported alert events further comprises referencing a description data file using said platform type.

6. The method of claim 5, wherein referencing said description data file comprises referencing a plain text "ini" file.

7. The method of claim 5, wherein referencing said description data file comprises referencing one of a management information format (MIF) file and a management information block (MIB) file.

8. In a server, a method comprising:
  receiving detected alert events of a client device from an integrated platform independent agent of the client device, in a platform independent manner, wherein said detected alert events further comprises:
    composing a network data packet, said network data packet including an event code, wherein said event code includes a BIOS POST code; and
    transmitting said network data packet including said event code to said remote alert proxy;
  receiving command data to the remote alert proxy in response to the detected alert events;
  translating said reported alert events to client specific hardware control data by referring to a platform specific section of an event description file using the mapped representation; and
  translating the command data into specific client-based hardware control data to automatically perform hardware control operations on the client device only while the client device is in an unresponsive state.

9. The method of claim 8, wherein said translating said reported alert events to platform specific events by said alert proxy further comprises referencing a description data file using said platform type.

10. The method of claim 9, wherein referencing said description data file comprises referencing a plain text "ini" file.

11. The method of claim 9, wherein referencing said description data file comprises referencing one of a management information format (MIF) file and a management information block (MIB) file.

12. An apparatus comprising logic to:
  receive detected alert events of a device from an integrated platform independent agent device in a platform independent manner, wherein said detected alert events further comprises:
    composing a network data packet, said network data packet including an event code, wherein said event code includes a BIOS POST code; and
    transmitting said network data packet including said event code to said remote alert proxy;
  receive command data sent in response to the detected alert events;
  translate said reported alert events to platform specific alert events by referring to a specific section of an event description file using the mapped representation; and
  translating the command data into specific client-based hardware control data to automatically perform hardware control operations on the device only while the device is in an unresponsive state.

13. The apparatus of claim 12, wherein said logic translates said received alert events to platform specific alert events by referencing a description data file using said platform type.

14. An article of manufacture comprising a machine-readable medium having a plurality of machine-readable instructions stored thereon, wherein when the instructions are executed by a processor, the instructions subscribe the processor to:
  receive detected alert events of a device from an integrated platform independent agent device in a platform independent manner, wherein said detected alert events further comprises:
    composing a network data packet, said network data packet including an event code, wherein said event code includes a BIOS POST code; and
    transmitting said network data packet including said event code to said remote alert proxy;
  receive command data sent in response to the detected alert events;
  parse the received detected alert event, according to an encapsulation protocol;
  assign values obtained by parsing the data packet to predetermined variables; and
  translate said received alert events to platform specific alert events, wherein translating includes comparing the assigned values to an event description file to determine platform specific alert information;
  reporting the platform specific alert information in a natural language;
  translating the command data into specific client-based hardware control data; and
  automatically perform hardware control operations on the device only while the device is in an unresponsive state based on the control data.

15. The article of manufacture of claim 14, wherein said instructions further subscribe the processor to determine whether the alert event describes a simple event, a compound event, or a software event.

* * * * *